(12) United States Patent
Michalewicz

(10) Patent No.: US 6,707,308 B1
(45) Date of Patent: Mar. 16, 2004

(54) MEASUREMENTS USING TUNNELLING CURRENT BETWEEN ELONGATE CONDUCTORS

(75) Inventor: Marek Tadeusz Michalewicz, West Footscray (AU)

(73) Assignee: Quantum Precision Instruments Pty Ltd., Flemington (AU)

( * ) Notice: Subject to any disclaimer, the term of this patent is extended or adjusted under 35 U.S.C. 154(b) by 0 days.

(21) Appl. No.: 09/786,641

(22) PCT Filed: Sep. 7, 1999

(86) PCT No.: PCT/AU99/00733
§ 371 (c)(1),
(2), (4) Date: Apr. 16, 2001

(87) PCT Pub. No.: WO00/14476
PCT Pub. Date: Mar. 16, 2000

(30) Foreign Application Priority Data

Sep. 7, 1998 (AU) .............................................. PP-5702
Dec. 14, 1998 (AU) .............................................. PP-7709

(51) Int. Cl.$^7$ ......................... G01R 31/08; G01R 27/08
(52) U.S. Cl. ........................ 324/716; 324/522; 324/713
(58) Field of Search .............................. 324/716, 76.12, 324/210, 211, 522, 713, 164

(56) References Cited

U.S. PATENT DOCUMENTS

| | | | | |
|---|---|---|---|---|
| 5,210,714 A | * | 5/1993 | Pohl et al. ................... | 365/157 |
| 5,307,311 A | * | 4/1994 | Sliwa, Jr. .................... | 365/174 |
| 5,404,349 A | * | 4/1995 | Nose et al. ................... | 369/126 |
| 5,418,771 A | | 5/1995 | Kasanuki et al. ........... | 369/126 |
| 5,432,356 A | * | 7/1995 | Imamura ..................... | 257/24 |
| 5,679,888 A | | 10/1997 | Tohda et al. .................. | 73/105 |
| 5,703,382 A | * | 12/1997 | Hack et al. ................... | 257/72 |
| 5,756,895 A | | 5/1998 | Kubena et al. .......... | 73/504.15 |
| 6,021,065 A | * | 2/2000 | Daughton et al. .......... | 365/158 |

FOREIGN PATENT DOCUMENTS

EP 0 262 253 A1 10/1986
WO WO 96/21157 A5 7/1996
WO WO 97/20189 6/1997

OTHER PUBLICATIONS

Die Differential–Tunnelstrecke als hochauflosender Lageabweichungssensor, H.–J Gevatter und A. Schoth, 449 F&M Feinwerktechnik & Messtechnik 100 (1992) Dec., No. 12, Munchen, DE.

An Integrated Lateral Tunneling Unit, Dai Kobayashi, et al, Micro Electro Mechanical Systems '92, 0–7803–0497–7/92 IEEE Feb. 4–Jul. 1992.

A Micromachined Unit for Tunnel Current Control, Dai Kobayashi, et al, Institute of Industrial Science, The University of Tokyo, 0–7803–2535–4/95 IEEE 1995.

Electrostatic Surface Drives: theorectical considerations and fabrication, Storrs Hoen, et al, Transducers '97, 1997 International Conference on Solid–State Sensors and Actuators, Chicago, Jun. 16–19, 1997.

Inelastic Tunneling Spectroscopy and Single–Electron Tunneling in an Adjustable Microscopic Tunnel Junction, Stephen Gregory, Physical Review Letters, vol. 64, No. 6, Feb. 5, 1990.

Microsensors Get Tunnelling, Design Engineering, p. 13, Nov. 1997.

Nonlithographic Nano–Wire Arrays: Fabrication, Physics, and Device Applications, Dmitri Routkevitch, et al, IEEE Transactions on Electron Devices, vol. 43, No. 10, Oct. 1996.

\* cited by examiner

*Primary Examiner*—N. Le
*Assistant Examiner*—John Teresinski
(74) *Attorney, Agent, or Firm*—Foley & Lardner

(57) ABSTRACT

Apparatus for use in measuring and/or monitoring the relative position or displacement of two elements, includes a pair of elongate electrical conductors (10, 11) adapted to be associated with the respective elements, and means (12, 13, 18) for disposing the conductors at a mutual separation such that a detectable quantum tunnelling current may be generated between them on application of an electrical potential difference between the conductors.

89 Claims, 4 Drawing Sheets

FIGURE 2
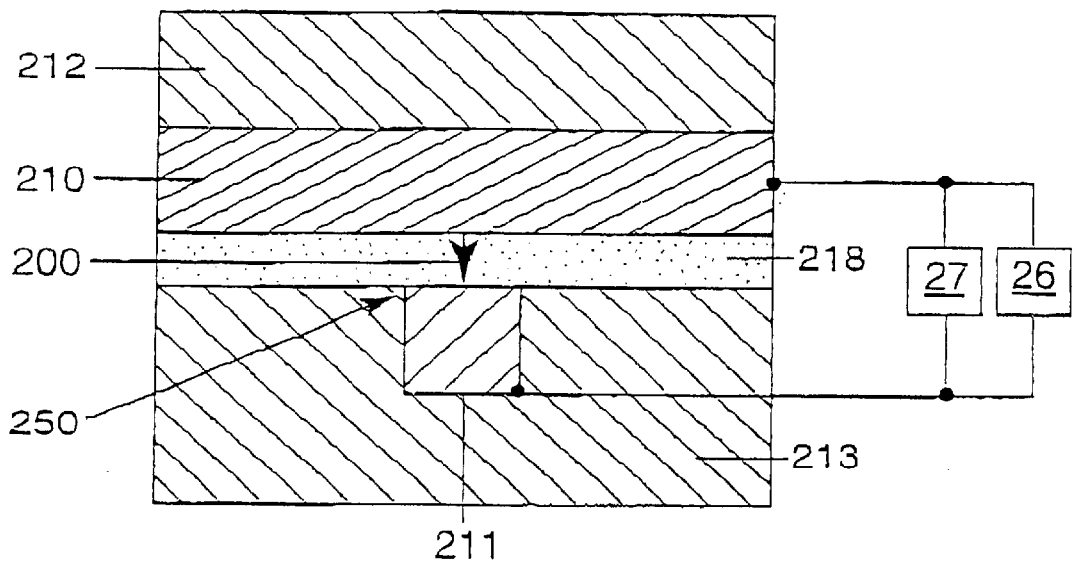
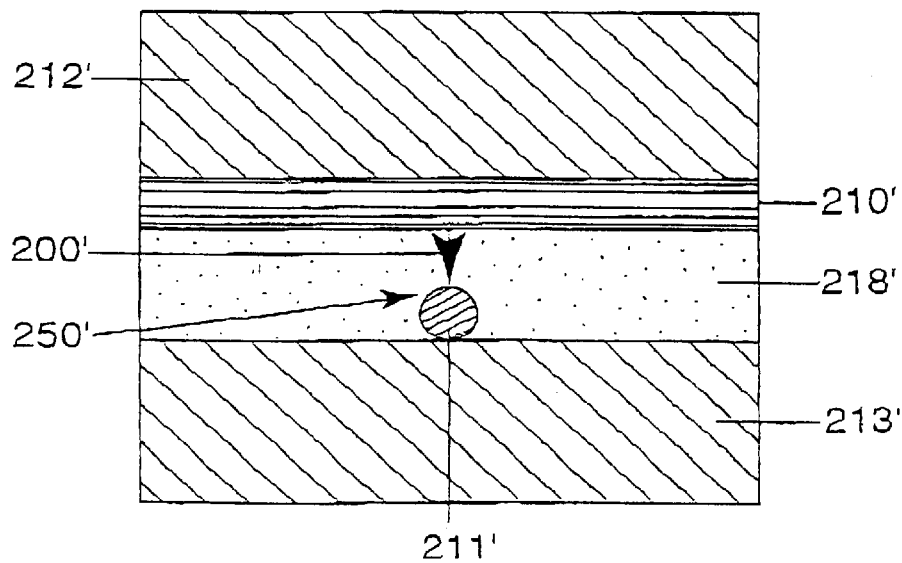
FIGURE 4

MEASUREMENTS USING TUNNELLING CURRENT BETWEEN ELONGATE CONDUCTORS

FIELD OF INVENTION

This invention relates to the accurate measurement and monitoring of fine relative positions or displacements, eg. rotational or angular separations or displacements, vibrations, linear separations or translations, alignments and misalignments. Of particular, though not exclusive, interest is measurement of angles.

BACKGROUND ART

Known devices designed for ultra precise measurement of angles include autocollimators, diffraction based systems and gears based systems. Autocollimators use measurement of angular deviation to determine in turn, eg, straightness, flatness, squareness and parallelism. Modern forms use laser diode light sources and beamsplitters, and incorporate a micrometer in the eyepiece viewing system for accurate measurement of angular displacement. Typical best accuracies are 0.2 arcseconds, for a measuring range of 150 arcseconds.

In a known goniometer-style instrument, a pair of radial gratings rotate in unison at a uniform speed and are scanned by a pair of reading heads. One of these is stationary while the other moves through the angle to be measured. The relative phase change between the two resultant signals is an indication of the rotation of the moveable reading head with respect to the fixed head. Accuracy achieved is said to be 0.1 arcsecond.

These prior devices are relatively expensive and typically rather large instruments. Often they form a key part of another scientific apparatus, such as a diffractemeter, where the precise measure of angle determines the resolution and quality of an instrument.

Accuracy of angular measurement is the subject of Zhang et al. "Improving the Accuracy of Angle Measurement System with Optical Grating", Annals of the CIRP Vol 43, No. 1 (1994). This paper proposes the use of index gratings with sine function transmissivity, and other enhancements, and reports an accuracy of 0.2 arcseconds with a prototype instrument.

It is an object of this invention to provide for fine measurement and monitoring of relative positions or displacements, whether angular, linear or otherwise, to a satisfactory accuracy that is preferably better than that achieved with known instruments and techniques.

SUMMARY OF THE INVENTION

The invention proposes an approach quite different from that previously used, and entails monitoring the quantum tunnelling current between two proximate electrical conductors, preferably of nano dimensions. In a preferred embodiment, two arrays of aligned conductors may be used, and these may advantageously be carbon nanotubes.

The invention accordingly provides, in a first aspect, a method of measuring and/or monitoring the relative position or displacement of two elements, including:

associating the elements with respective elongate electrical conductors;

disposing the conductors preferably in approximate alignment, at a mutual separation and applying an electrical potential difference such that there is a detectable quantum tunnelling current between them; and detecting and/or measuring said quantum tunnelling current.

Preferably, the relative positions of the conductors is adjusted to determine that position at which maximum quantum tunnelling current is detected.

In a second aspect, the invention provides apparatus for use in measuring and/or monitoring the relative position or displacement of two elements. The apparatus includes a pair of elongate electrical conductors adapted to be associated with the respective elements, and means for disposing the conductors, preferably substantially aligned in mutually parallel relationship, at a mutual separation such that a detectable quantum tunnelling current may be generated between them on the application of an electrical potential difference between the conductors.

The apparatus may further include means to apply said potential difference, and means to detect and/or measure the quantum tunnelling current between the conductors.

Preferably, the apparatus further includes means to adjust the relative positions of the conductors to determine that position at which maximum quantum tunnelling current is detected.

The position or displacement may be one or more of a rotational or angular separation or displacement, a vibration, a linear separation or translation, an alignment and a misalignment.

Preferably, the electrical conductors are of width 1 micron or less eg, in one or more embodiments, of width in the nano-order to sub-micron range. In the latter case, the conductors may be carbon nanotubes of arbitrary helicity or radius, either single or multi-walls of carbon monofilaments, or nanowires. Alternatively, the conductors may be, eg, micron to sub-micron quasi one-dimensional conductors. In some embodiments, the conductors may be of length 1 mm or less.

The conductors may be associated with the aforesaid elements by being mounted in or on an insulating or semi-conducting substrate, preferably flush with a surface of the substrate. The substrate may be, eg. a solid or a crystal face. The conductors may be placed along respective atomic steps on a vicinal surface.

Advantageously, the electrical conductors are arranged in respective ordered grids or arrays of electrical conductor segments, preferably wired in parallel e.g. through a single supply lead, which grids or arrays are complementary and overlaid to place the conductor segments in sufficient proximity to obtain detectable quantum tunnelling currents.

BRIEF DESCRIPTION OF THE DRAWINGS

The invention will now be further described, by way of example only, with respect to the accompanying drawings, in which:

FIG. 2 is a modification of the embodiment of FIG. 1 in which the conductors are substantially at right angles;

FIG. 4 is a view similar to FIG. 2 of a modification of the embodiment of FIG. 3;

Figure 1:
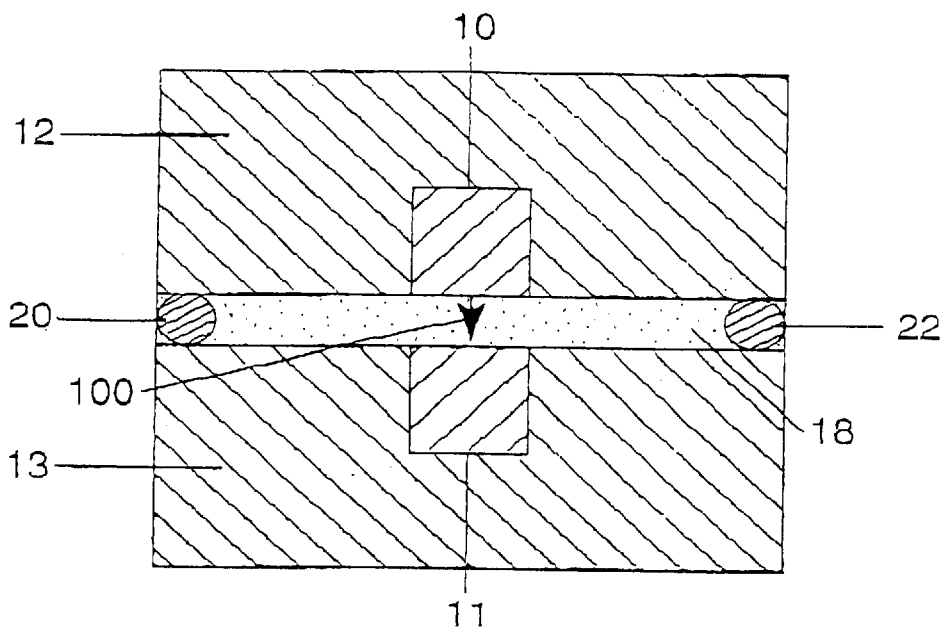
FIG. 1 is a fragmentary cross-section of a first embodiment of nano-dimension device according to the invention, with the respective conductors generally aligned and electrical connections diagrammatically depicted.

In the embodiment of FIG. 1, respective nano-dimension elongate electrically conductive wires 10, 11, of widths in the nano to sub-micron dimension range, are embedded flush in respective insulating medium substrates 12, 13. In this case, the wires are superposed in substantially aligned parallel relationship, at a separation or gap 18 in the range 2–50 Angstroms, such that when an electrical potential difference is applied by a potential source 26 across the conductors, there is a quantum tunnelling current 100 between them detectable in suitable detection circuit 27.

A suitable technique for making the embodiment is electron beam nanolithography, in which aligned conducting wire can be delineated on a semi-conducting substrate. This is described, eg. in Wilkinson et al, "Electron Beam Nanolithography", an article in the text "The Physics and Fabrication of Microstructures and Microdevices" (eds. Kelly & Weisbuch, Spring-Verlag, 1986) that describes and illustrates a set of parallel GaAs conducting wires on a semi-insulating substrate. In practical applications of the device, substrates or plates 12, 13 are associated or coupled to respective elements whose displacement or position is to be measured or monitored.

In general, tunnelling current 100 is proportional to the product of the local densities of states on a pair of adjacent electrodes (ie. conductors), or in other terms, to the sum of the square of the tunnelling matrix elements between states on both electrodes. It is also a sensitive function of the tunnelling potential and the electrode curvature. Furthermore, quantum tunnelling current is critically dependent on the spacing between the conductors because the quantum wave function decays exponentially outside the conductor surface, and the detected current will be a function of the relative angle between a pair of crossed nanotubes. The invention takes advantage of the aforementioned exponential and angular relationship in that the detected value of the tunnelling current 100 will change sharply as the longitudinal opposed surface segments of the conductor move apart with increasing rotational and/or translational misalignment or vice versa.

More particularly, suitable Schrodinger wave functions for the gap 18 are found in Kiejna & Wojciechowski, "Metal Surface Electron Physics", Pergamon (1996). It could be demonstrated from wave function analysis that the quantum tunnelling current is critically dependent on the spacing between the conductors because the quantum wave function decays exponentially outside the conductor surface, and the detected current will also be a function of the relative angle between a pair of crossed nanoconductors.

The gap 18 between the aligned opposed conductor surface segments is thought to be most appropriately in the range 2–50 Angstroms, more preferably 2–20 Angstroms. The conductor segments may conveniently be of any length that can practicably be placed and aligned on the substrate and have leads attached, eg. in the range $1\mu$ to $10^{-2}$ m long.

Gap 18 may be a partial vacuum or may be filled with an appropriate medium. Suitable arrangements for accurately maintaining the gap 18 include the use of buckyball ($C_{60}$) nanobearings 20, 22, or the interpositioning of a separation film of an organic medium, preferably an organic lubricant eg. cyclohexane (further disclosed below). The latter is thought to be a particularly effective approach to the maintenance of accurately parallel fine separation.

The adjustment means may include piezoelectric positioners of known type suitable for performing adjustments at nano dimension level.

The aforementioned effect is further enhanced if the conductors are cylindrical, as for carbon nanotubes. In the case of the grids or arrays if the conductor segments are connected in parallel, there will be an amplifying effect and this will facilitate current measurement. However, if the lines have independent connections, the grids forming the sandwich will be able to act as two dimensional arrays of point "capacitors" which can be switched on and off independently, forming a "pixelised" array of tunnelling wells.

The tunnelling current 100 will exhibit minima at one or more positions dependent on the aspect ratio (length to separation of conductor segments), and a maximum when the conductor segments of the two grids/arrays are perfectly aligned.

Figure 3:
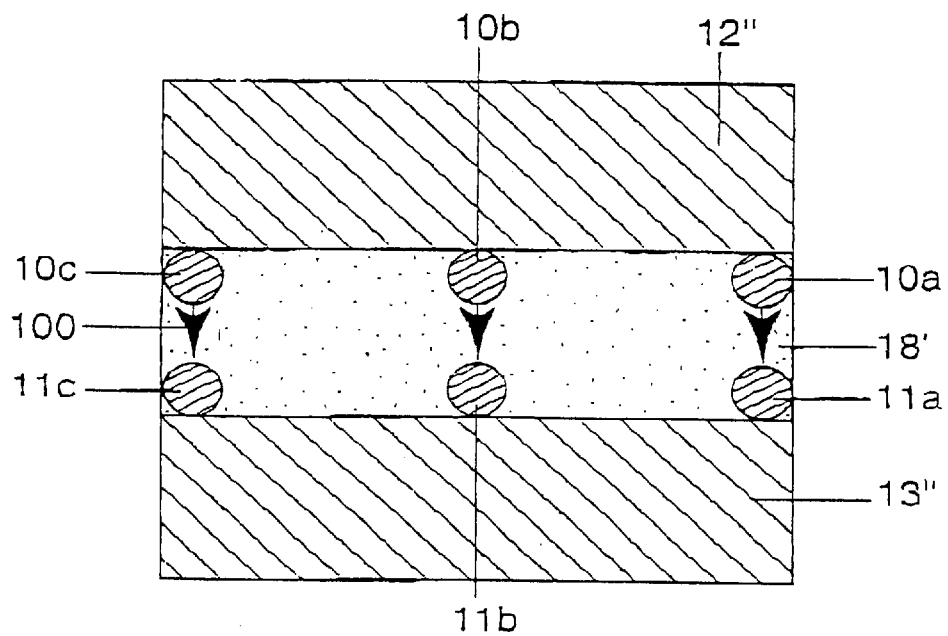
FIG. 3 is a view similar to FIG. 1 of an embodiment that utilises multiple nanotube conductors.

FIG. 3 illustrates an alternative embodiment in which the electrical conductors comprise multiple parallel nanotubes 10a, 10b, 10c, 11a, 11b, 11c deposited on insulating medium substrates 12', 13'.

Procedures for producing a set of aligned nanotubes on a substrate are described, for example, at Chauvet et al, Physical Review B52, 52 (1995); de Heer, et al, Science 268, 845 (1995); and Kiang et al, Carbon 33, 903–914 (1995).

The properties of single wall nanotubes are described, for example, in Iijima, Nature 354, 56–58 (1991) and Iijima et al, Nature 363, 603–605 (1993). Carbon nanotubes of a variety of types are also described in Östling et al, Physical Review B, 55, 55 (1997).

Figure 5:
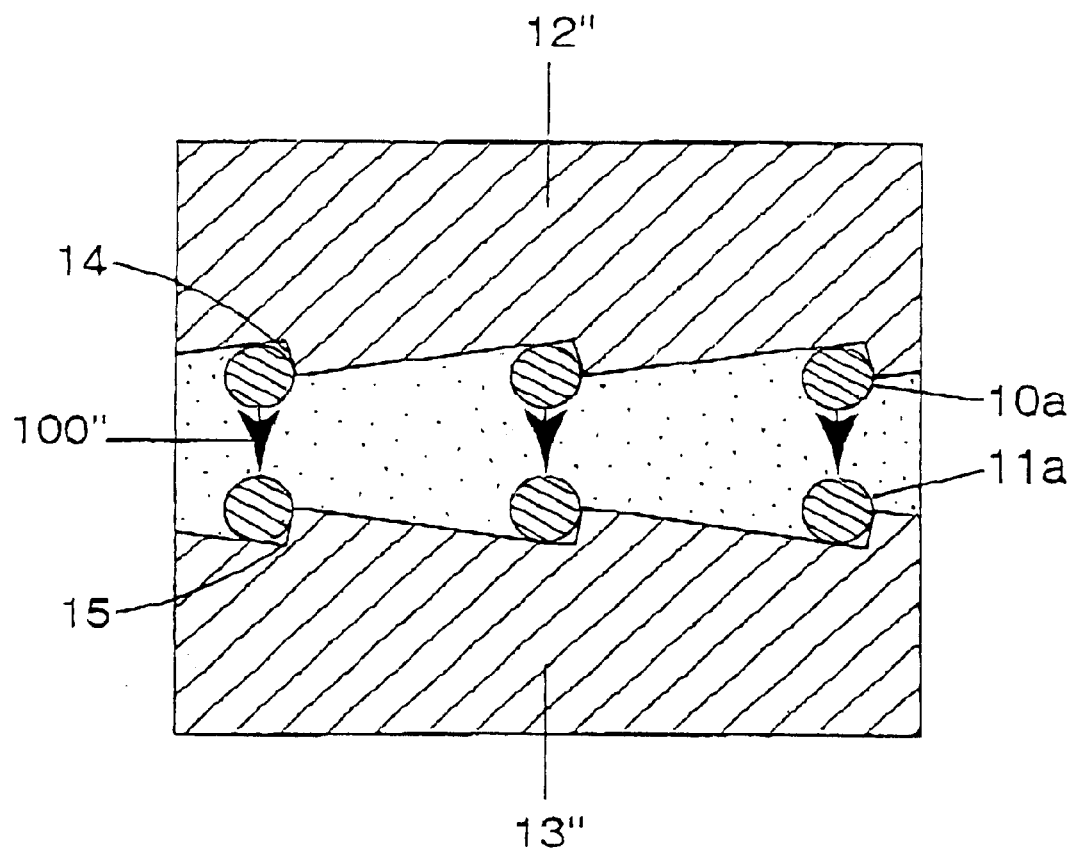
FIG. 5 depicts a variation of the embodiment of FIG. 3, formed in a particular manner.

A particular technique for producing a grid of parallel conductor segments suitable for this invention is by epitaxial deposition of nanotubes or other nano-dimension conductors on the atomic steps of a vicinal surface produced by slicing a crystal at an angle to a primary plane. The separation of the conductor segments may be regular or irregular, but is most preferably parallel. FIG. 5 shows a modification of the embodiment of FIG. 3 in which the nanotubes are deposited in this way at the successive atomic steps 14, 15 on a stepped vicinal surface.

FIGS. 2 and 4 illustrate embodiments in which the respective arrays of conductors of micron, submicron or nano-order dimensions when not nanotubes, are arranged with the conductors 210 of one array in or on substrate 212, extending substantially at right angles to the conductors 211 of the other array, in or on substrate 213. Instead of a right angle, the angular relationship may be at some other angle, eg. to form a diamond or rhomboidal type of two dimensional lattice. In one application of such an arrangement preferably utilising a large number of conductor lines, the set of cross-over points 250 will form an artificial scattering lattice effective to scatter a beam of atoms directed parallel to the sandwich structure into the space 216 between the conductor arrays. If each line is independently electrically connected, ie they are not electrically in parallel, there will be a pixellised array which is an analog of a two-dimensional "pinball game" for atoms, with predefined scattering centres.

In a variation of the scattering lattice, it may further include an array of magnetic elements forming the lattice and creating 1-dimensional domains at or between the cross-over points.

Figure 6:
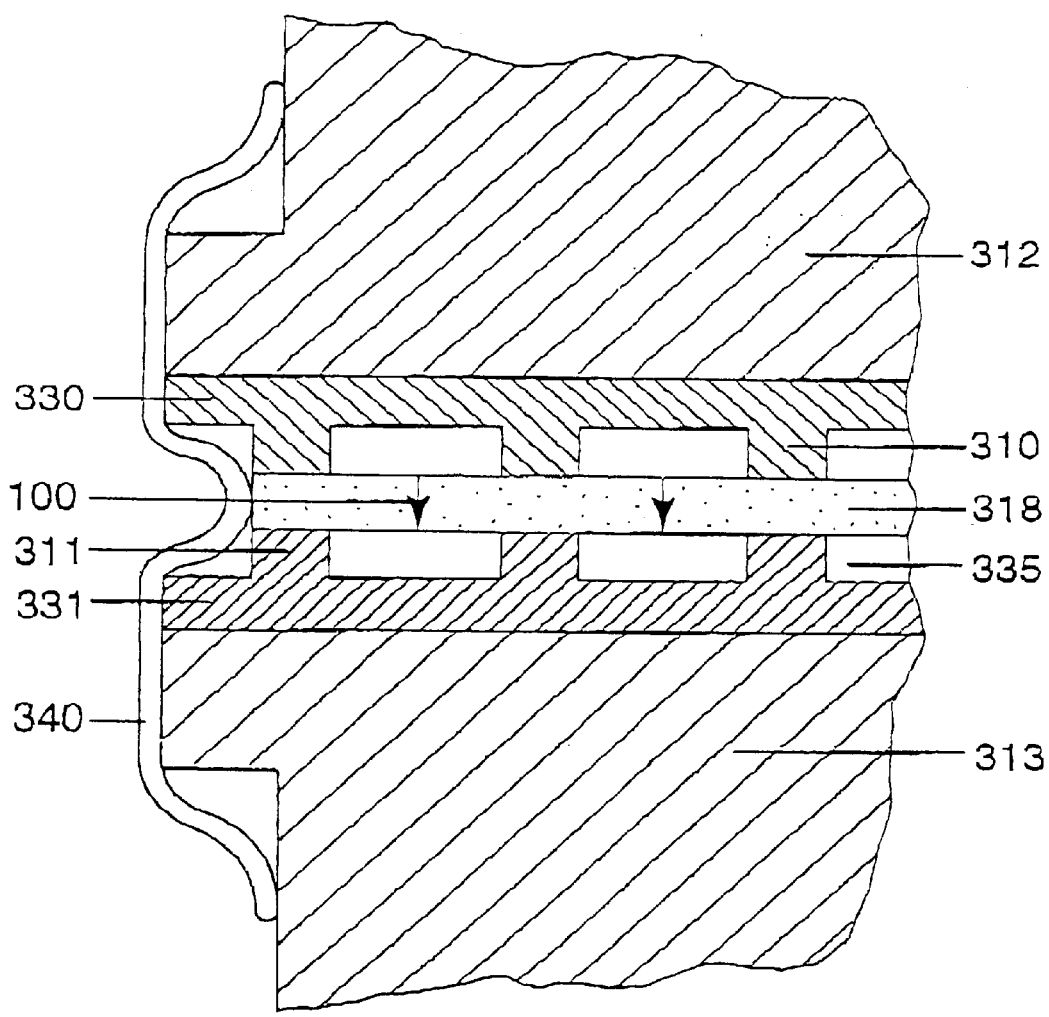
FIG. 6 is a view similar to FIGS. 1 and 3 of a further embodiment of the invention that utilises an etched conductive overlay and a film applied by Langmuir-Blodgett technology.

FIG. 6 is a further embodiment in which each substrate 312, 313 is atomically smooth freshly cleaved mica, and the conductors 310, 311 are formed by etching an overlay 330, 331 of gold, and then filling the interstitial grooves by application of a molecular monolayer by a Langmuir-Blodgett process. The two arrays may be separated as before by a cyclohexane or other suitable organic lubricant film 318 maintained by an outer thermoshrink wrap 340.

The illustrated devices are effective electro-mechanical nanodevices. On the one hand, they may be applied to the measurement of angles, angles of rotation, rotational speed, and alignment or misalignment at microscopic and macroscopic level. Rotational speed can be measured, for example, by measuring the number of current maxima per unit of time. It is thought to be capable of an accuracy of the order of 0.01 arcseconds over an operational angular range of 20° or so.

Alternatively, the illustrated devices may be used for measuring or monitoring relative linear position or translation. If one substrate in the embodiments of FIGS. 3, 5 and 6 is translated with respect to the other, there will be a series of very sharp peaks observed in tunnelling current 100. The distance traversed will be given by the number of observed peaks times the separation between the conductors; the resolution will be of the order of the width of the conductors, i.e. about 200 Angstroms with currently available nanolithography technology, but about 10–30 Angstroms with nanotubes.

The rotational and translational effects would both contribute to vibration monitoring or measurement, eg. in a seismograph.

What is claimed is:

1. Apparatus for measuring and/or monitoring the relative position or displacement of two elements, comprising:
   a pair of elongate electrical conductors adapted to be associated with the respective elements; and
   wherein the conductors are arranged at a mutual separation with a variable relative angle between the conductors such that a detectable quantum tunneling current which is a function of said relative angle may be generated between the conductors on application of an electrical potential difference between said conductors.

2. Apparatus according to claim 1, further including means to adjust the relative positions of the conductors to determine that position at which maximum quantum tunneling current is detected.

3. Apparatus according to claim 2 wherein said adjustment means includes one or more piezoelectric positioners.

4. Apparatus according to claim 1 wherein said elongate electrical conductors are substantially aligned in mutually parallel relationship whereby said relative angle is a measure of misalignment between the conductors.

5. Apparatus according to claim 1, wherein said elongate electrical conductors are arranged in respective ordered grids or arrays of electrical conductor segments, which grids or arrays are complementary and overlaid to place the conductor segments in sufficient proximity to obtain detectable quantum tunneling currents.

6. Apparatus according to claim 5 wherein the conductor segments of each said grid or array or substantially parallel but aligned at said relative angle to the conductor segments of the other grid(s) or array(s).

7. Apparatus according to claim 5 wherein the conductor segments of each grid or array are wired electrically in parallel.

8. Apparatus according to claim 1 wherein said elongate electrical conductors are of the order of micron to nanometer dimensions.

9. Apparatus according to claim 8 wherein said elongate electrical conductors are carbon nanotubes or nanowires, or micron to sub-micron quasi one dimensional conductors.

10. Apparatus according to claim 9 where said conductors are flush with a surface of the respective substrates.

11. Apparatus according to claim 1 wherein said conductors are associated with the aforesaid elements by being mounted in or on respective insulating or semiconductive substrates.

12. Apparatus according to claim 1 wherein each said electrical conductor is disposed along a respective atomic step on a vicinal surface providing a substrate.

13. Apparatus according to claim 1 wherein said elongate electrical conductors comprise respective segments of an integral conductive layer on an insulating or semiconductive substrate.

14. Apparatus according to claim 13, wherein said segments are separated and/or overlaid by a membrane or film of insulating medium.

15. Apparatus according to claim 1 wherein said mutual separation of opposed surface segments of said electrical conductors is in the range 2–50 Angstroms.

16. Apparatus according to claim 1 wherein said mutual separation of opposed surface segments of said electrical conductors is in the range of 2–20 Angstroms.

17. Apparatus according to claim 1, wherein said conductors are in one or more conductor segments of length in the range $10^{-6}$ to $10^{-2}$ m.

18. Apparatus according to claim 1, further comprising an intervening film for disposing said conductors at said mutual separation and means to confine said film.

19. Apparatus according to claim 18 where said intervening film is a film of an organic medium including an organic solvent.

20. Apparatus according to claim 1, further comprising nanotube or buckyball ($C_{60}$) bearings for disposing said conductors at said mutual separation.

21. Apparatus according to claim 1, wherein said position or displacement measured and/or monitored is one or more of a rotational or angular separational displacement, a vibration, a linear separation or translation, an alignment and a misalignment.

22. Apparatus according to claim 1, said elongate electrical conductors are arranged in respective ordered grids or arrays of electrical conductor segments, whereby the cross-over points of the respective arrays define a lattice of electrostatic scattering wells.

23. Apparatus according to claim 22, wherein said lattice further includes an array of magnetic elements forming the lattice and creating 1-dimensional domains at or between said cross-over points.

24. Apparatus according to claim 1 further including means to apply said electrical potential difference, and means to detect and/or measure said quantum tunneling current between said conductors.

25. A method of measuring and/or monitoring the relative position or displacement of two elements, comprising:
   associating the elements with respective elongate electrical conductors; disposing the conductors at a mutual separation with a variable relative angle between the conductors and applying to the conductors an electrical potential difference such that there is a detectable quantum tunneling current between the conductors that is a function of said relative angle; and detecting and/or measuring said quantum tunneling current.

26. A method according to claim 25, further including adjusting the relative positions of the conductors to determine one or more positions at which maximum quantum tunneling current is detected.

27. Apparatus for measuring and/or monitoring a relative position or displacement of two elements, comprising:

respective ordered grids or arrays of elongate electrical conductor segments adapted to be associated with the respective elements; and wherein the grids or arrays are arranged in a complementary and overlaid mutual separation to place the conductor segments in sufficient proximity for a detectable quantum tunneling current to be generated between the grids or arrays on application of an electrical potential difference between the grids or arrays.

28. Apparatus according to claim 27, further including means to adjust the relative positions of the grids or arrays to determine that position at which maximum quantum tunneling current is detected.

29. Apparatus according to claim 28 wherein said means to adjust is arranged to adjust said relative position laterally of the elongate electrical conductor segments without changing said mutual separation of the grids or arrays.

30. Apparatus according to claim 28 wherein said adjustment means includes one or more piezoelectric positioners.

31. Apparatus according to claim 27 wherein the conductor segments of each said grid or array are substantially parallel but aligned at an angle to the conductor segments of the other grid(s) or array(s).

32. Apparatus according to claim 27 wherein the conductor segments of each grid or array are wired electrically in parallel.

33. Apparatus according to claim 27 wherein said elongate electrical conductor segments are of the order of micron to nanometer dimensions.

34. Apparatus according to claim 33 wherein said elongate electrical conductor segments are carbon nanotubes or nanowires, or micron to sub-micron quasi one dimensional conductors.

35. Apparatus according to claim 27 further comprising an intervening film for disposing said grids or arrays at said mutual separation and means to confine said film.

36. Apparatus according to claim 35 where said intervening film is a film of an organic medium including an organic solvent.

37. Apparatus according to claim 27 further comprising nanotube or buckyball ($C_{60}$) bearings for disposing said grids or arrays at said mutual separation.

38. Apparatus according to claim 27 wherein said position or displacement measured and/or monitored is one or more of a rotational or angular separational displacement, a vibration, a linear separation or translation, an alignment and a misalignment.

39. Apparatus according to claim 27 arranged whereby the cross-over points of the respective arrays define a lattice of electrostatic scattering wells.

40. Apparatus according to claim 39, wherein said lattice further includes an array of magnetic elements forming the lattice and creating 1-dimensional domains at or between said cross-over points.

41. Apparatus according to claim 27 further including means to apply said electrical potential difference, and means to detect and/or measure said quantum tunneling current between said grids or arrays.

42. Apparatus according to claim 27 further comprising a first device which is adapted to measure or monitor the relative position or displacement of the two elements based on a detected quantum tunneling current.

43. Apparatus according to claim 42 further comprising:
a first substrate supporting a first grid or array of elongate electrical conductor segments; and
a second substrate supporting a second grid or array of elongate electrical conductor segments, such that the first grid or array is separated by a gap from the second grid or array to allow the tunneling current to be generated between the first grid or array and the second grid or array.

44. Apparatus according to claim 43 wherein the magnitude of said gap does not change with said relative displacement of the two elements.

45. Apparatus according to claim 43 wherein the first device is adapted to measure or monitor one or more of a rotational or angular separational displacement, a vibration, a linear separation or translation, an alignment and a misalignment between the two elements.

46. Apparatus according to claim 45 wherein the magnitude of said gap does not change with said relative displacement of the two elements.

47. Apparatus of claim 27 wherein the elongate electrical conductors comprise nanotubes.

48. Apparatus of claim 27 further comprising a means for disposing the grids or arrays in a complementary and overlaid mutual separation to place the conductor segments in sufficient proximity for a detectable quantum tunneling current to be generated between the grids.

49. Apparatus of claim 48 further comprising a means for measuring or monitoring the relative position or displacement of the two elements based on a detected quantum tunneling current.

50. Apparatus according to claim 27 wherein the respective ordered grids or arrays of elongate electrical conductor segments comprise a first ordered grid or array of elongate electrical conductor segments associated with a first of said elements, and a second ordered grid or array of elongate electrical conductor segments associated with a second of said elements.

51. Apparatus for measuring and/or monitoring a relative position or displacement of two elements, comprising:
respective ordered arrays of parallel elongate electrical conductors adapted to be associated with the respective elements; and
wherein the arrays are arranged at a mutual separation in which the electrical conductors of the arrays are substantially aligned in mutually parallel relationship, such that when said elements change their relative position laterally of said conductors, a detectable quantum tunneling current generated between the conductors on application of an electrical potential difference between the conductors exhibits a series of peaks that provide a measure of said relative position or displacement.

52. Apparatus according to claim 51, further including means to adjust the relative positions of the conductors to determine that position at which maximum quantum tunneling current is detected.

53. Apparatus according to claim 52 wherein said adjustment means includes one or more piezoelectric positioners.

54. Apparatus according to claim 51 wherein said elongate electrical conductors are of the order of micron to nanometer dimensions.

55. Apparatus according to claim 54 wherein said elongate electrical conductors are carbon nanotubes or nanowires, or micron to sub-micron quasi one dimensional conductors.

56. Apparatus according to claim 51 wherein said conductors are associated with the aforesaid elements by being mounted in or on respective insulating or semiconductive substrates.

57. Apparatus according to claim 56 where said conductors are flush with a surface of the respective substrates.

58. Apparatus according to claim 51 wherein each said electrical conductor is disposed along a respective atomic step on a vicinal surface providing a substrate.

59. Apparatus according to claim 51 wherein said elongate electrical conductors comprise respective segments of an integral conductive layer on an insulating or semiconductive substrate.

60. Apparatus according to claim 59, wherein said segments are separated and/or overlaid by a membrane or film of insulating medium.

61. Apparatus according to claim 51 wherein said mutual separation of opposed surface segments of said electrical conductors is in the range 2–50 Angstroms.

62. Apparatus according to claim 51 wherein said mutual separation of opposed surface segments of said electrical conductors is in the range of 2–20 Angstroms.

63. Apparatus according to claim 51, wherein said conductors are in one or more conductor segments of length in the range $10^{-6}$ to $10^{-2}$ m.

64. Apparatus according to claim 51, further comprising an intervening film for disposing said conductors at said mutual separation and means to confine said film.

65. Apparatus according to claim 64 where said intervening film is a film of an organic medium including an organic solvent.

66. Apparatus according to claim 51, further comprising nanotube or buckyball ($C_{60}$) bearings for disposing said conductors at said mutual separation.

67. Apparatus according to claim 51, wherein said position or displacement measured and/or monitored is one or more of a rotational or angular separational displacement, a vibration, a linear separation or translation, an alignment and a misalignment.

68. Apparatus according to claim 51 further including means to apply said electrical potential difference, and means to detect and/or measure said quantum tunneling current between said conductors.

69. Apparatus according to claim 51 further comprising a first device which is adapted to measure or monitor the relative position or displacement of the two elements based on a detected quantum tunneling current.

70. Apparatus according to claim 69 further comprising:
a first substrate supporting a first array of elongate electrical conductor segments; and
a second substrate supporting a second array of elongate electrical conductor segments, such that the first array is separated by a gap from the second array to allow the tunneling current to be generated between the first array and the second array.

71. Apparatus according to claim 70 wherein the magnitude of said gap does not change when said elements change their position laterally of said elongate electrical conductors.

72. Apparatus according to claim 70 wherein the first device is adapted to measure or monitor one or more of a rotational or angular separational displacement, a vibration, a linear separation or translation, an alignment and a misalignment between the two elements.

73. Apparatus according to claim 51, wherein the elongate electrical conductors comprise nanotubes.

74. Apparatus according to claim 51 wherein when said elements change their position laterally of said elongate electrical conductors, a gap between said arrays at said mutual separation of the arrays does not change in magnitude.

75. Apparatus according to claim 51 wherein the arrays are arranged at a mutual separation in which the electrical conductors of the arrays are substantially aligned in mutually parallel relationship, such that when said elements change their relative position laterally of a direction of the parallel elongate electrical conductors, a detectable quantum tunneling current generated between the conductors on application of an electrical potential difference between the conductors exhibits a series of peaks that provide a measure of said relative position or displacement.

76. Apparatus according to claim 51 further comprising a means for disposing the arrays at a mutual separation in which the electrical conductors of the arrays are substantially aligned in mutually parallel relationship, such that when said elements change their relative position laterally of said conductors, a detectable quantum tunneling current generated between the conductors on application of an electrical potential difference between the conductors exhibits a series of peaks that provide a measure of said relative position or displacement.

77. Apparatus according to claim 51 wherein the respective ordered arrays of parallel elongate electrical conductors comprise a first ordered array of parallel elongate electrical conductors associated with a first of said elements, and a second ordered array of parallel elongate electrical conductors associated with a second of said elements.

78. A method of measuring and/or monitoring the relative position or displacement of two elements, comprising:
associating the elements with respective ordered grids or arrays of elongate electrical conductor segments;
disposing the grids or arrays in a complementary and overlaid mutual separation to place the conductor segments in sufficient proximity that, on applying to the conductors an electrical potential difference there is generated a detectable quantum tunneling current between the grids or arrays; and
detecting and/or measuring said quantum tunneling current.

79. A method according to claim 78, further comprising adjusting the relative positions of the grids or arrays to determine one or more positions at which maximum quantum tunneling current is detected.

80. Method according to claim 78 further comprising measuring or monitoring the relative position or displacement of the two elements based on the detected or measured quantum tunneling current.

81. Method according to claim 80 wherein:
a first substrate supports a first grid or array of elongate electrical conductor segments;
a second substrate supports a second grid or array of elongate electrical conductor segments; and
applying to the conductors the electrical potential difference generates the detectable quantum tunneling current across a gap between the first grid or array and the second grid or array.

82. Method according to claim 80 wherein the magnitude of said gap does not change with said relative displacement of the two elements.

83. Method according to claim 80 wherein the step of measuring or monitoring the relative position or displacement comprises measuring or monitoring the relative displacement.

84. Method according to claim 80 wherein the step of measuring or monitoring the relative position or displacement comprises measuring or monitoring the relative position.

85. Method according to claim 80 wherein the step of measuring or monitoring the relative position or displacement comprises measuring or monitoring one or more of a rotational or angular separational displacement, a vibration, a linear separation or translation, an alignment and a misalignment between the two elements.

86. Method according to claim 78 wherein the respective ordered grids or arrays of elongate electrical conductor segments comprises a first ordered grid or array of elongate electrical conductor segments associated with a first of said elements, and a second ordered grid or array of elongate electrical conductor segments associated with a second of said elements.

87. A method of measuring and/or monitoring the relative position or displacement of two elements, comprising:

associating the elements with respective ordered arrays of parallel elongate electrical conductors;

disposing the arrays at a mutual separation in which the electrical conductors of the arrays are substantially aligned in mutual parallel relationship, and applying to the conductors an electrical potential difference such that there is a detectable quantum tunneling current generated between the conductors that exhibits a series of peaks that provide a measure of said relative position or displacement; and detecting and/or measuring said quantum tunneling current.

88. A method according to claim 87, further comprising adjusting the relative positions of the arrays to determine one or more positions at which maximum quantum tunneling current is detected.

89. Method according to claim 87 wherein the respective ordered arrays of parallel elongate electrical conductors comprise a first ordered array of parallel elongate electrical conductors associated with a first of said elements, and a second ordered array of parallel elongate electrical conductors associated with a second of said elements.

* * * * *